Patented Dec. 16, 1930

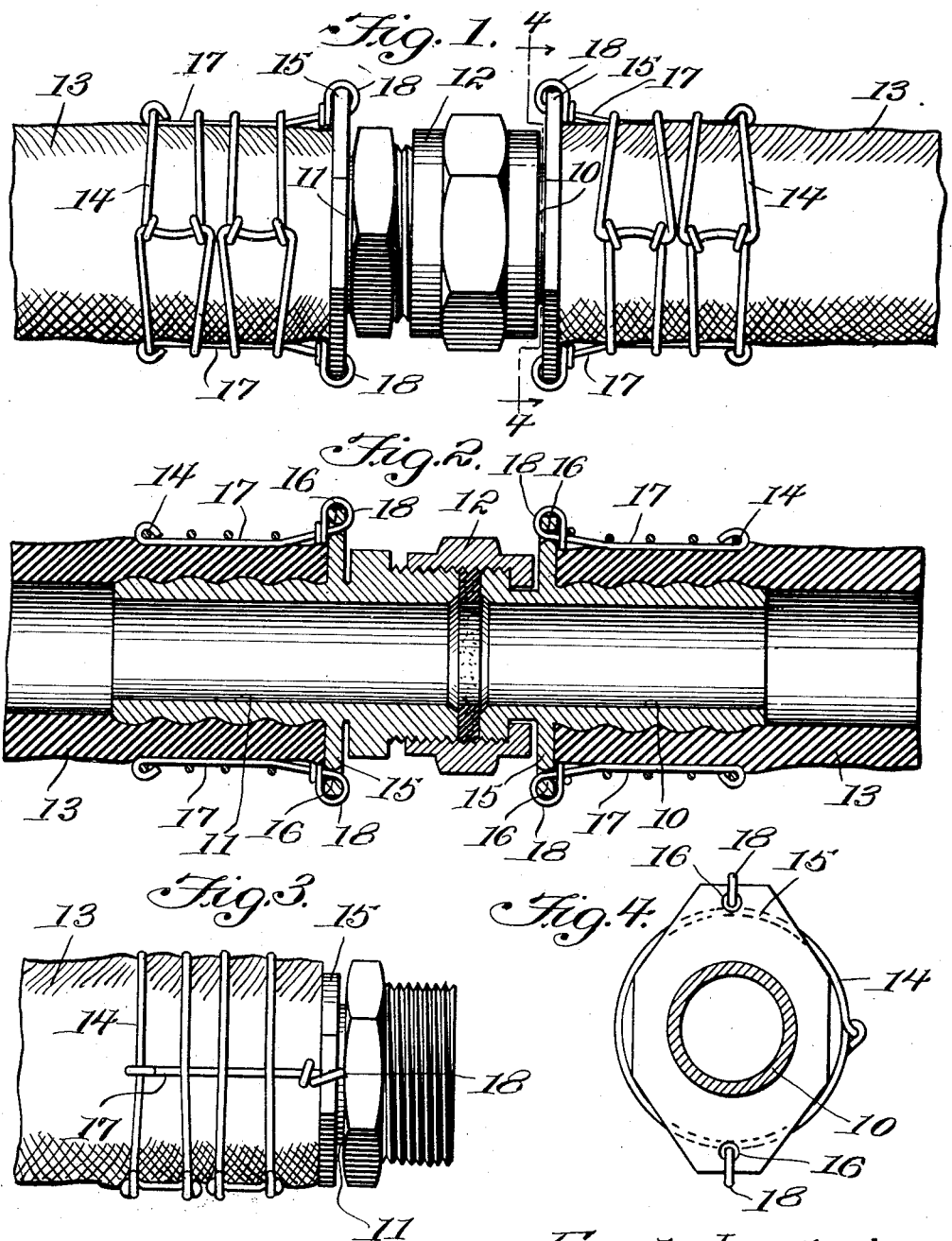

1,785,638

UNITED STATES PATENT OFFICE

FRED LUDWIG, OF HONOLULU, TERRITORY OF HAWAII

HOSE COUPLING

Application filed June 29, 1928. Serial No. 289,266.

This invention relates generally to hose couplings, and more particularly to a novel construction of means for preventing the hose sections from slipping off or becoming separated from the respective sections of the coupling.

The nature and advantages of the invention will be better understood when the following detail description is read in connection with the accompanying drawing, the invention residing in the construction, combination and arrangement of parts as claimed.

In the drawing forming part of this application like numerals of reference indicate similar parts in the several views and wherein:

Figure 1 is a view illustrating the invention in elevation.

Figure 2 is a longitudinal sectional view through Figure 1.

Figure 3 is a detail view of one of the sections of the coupling.

Figure 4 is a sectional view on line 4—4 of Figure 1.

Referring to the drawing in detail 10 represents the female member of the coupling, the male member being indicated at 11, the former being provided with a threaded collar 12 rotatably mounted thereon and adapted to be threadedly associated with the adjacent end of the male section 11. The body portion of each coupling section is received by the adjacent section 13 of a hose, and the coupling sections are preferably corrugated as illustrated to obtain an effective grip upon the hose sections.

Considerable difficulty has been heretofore experienced with hose couplings, and more particularly with high pressure lines, due to the fact that the hose section frequently slips from the hose coupling. Some times this is due to the rubber breaking loose from the fabric, or getting soft and gummy, preventing a tight connection between the hose section and the coupling member. It is therefore the object of the present invention to provide means for effectively holding the coupling sections immovably positioned within the hose sections. In carrying out the invention I preferably employ a plurality of clamps which embrace the hose sections 13, and while these clamps may be constructed in any suitable manner and from any suitable material, they are preferably formed from wire as illustrated. The clamps are indicated at 14 and effectively clamp the hose about the adjacent coupling section. Each coupling section is provided with a collar 15 preferably of hexagon shape as illustrated in Figure 4, the collar being of a size to project an appreciable distance beyond the hose sections at diametrically opposite points, and these projecting portions being provided with openings 16 clearly illustrated in Figure 4. Forming part of the wire clamps 14 are diametrically opposed longitudinally arranged strands 17, arranged on each hose section, the corresponding outer ends being looped to receive the adjacent portion of the clamps 14, these strands passing between the clamps and the hose sections 13 as illustrated. The corresponding forward extremities of the strands 17 terminate to form loops 18 which pass through the openings 16 of the adjacent collar 15, thereby providing a direct and positive connection between the hose section 13 and the adjacent coupling section. Consequently the hose cannot slip off or become otherwise separated from the coupling.

While it is believed that from the foregoing description the nature and advantages of the invention will be readily understood, I desire to have it known that I do not limit myself to what is herein shown and described and that such changes may be resorted to when desired as fall within the scope of what is claimed.

What is claimed is:

In combination with a hose a nipple therefor, of means for attaching the hose to the nipple, including a collar supported by the nipple and against which the adjacent end of the hose is adapted to engage, said collar being shaped to provide apertured extensions projecting beyond the sides of the hose at diametrically opposite points, a pair of wire clamps surrounding the hose, each clamp including spaced convolutions formed from a single length of wire and having a closed end, the free ends of each clamp being looped about the closed end thereof, and spaced longitudinal strands of wire connecting the convolutions of both clamps and arranged at diametrically opposite points along the hose, each of said strands being bent outwardly from its point of contact with said clamp in the direction of said collar, with said portion spaced from the hose, the corresponding extremities of said bent portions being passed through the apertures of said extensions and looped about the latter, and finally coiled about the bent portions passing between the space between the latter and the hose.

In testimony whereof I affix my signature.

FRED LUDWIG.